United States Patent
Friesen et al.

(10) Patent No.: US 9,029,027 B2
(45) Date of Patent: May 12, 2015

(54) DEGENERATE DOPING OF METALLIC ANODES

(71) Applicant: Fluidic, Inc., Scottsdale, AZ (US)

(72) Inventors: Cody A. Friesen, Fort McDowell, AZ (US); Robert A. Zeller, Scottsdale, AZ (US); Paul B. Johnson, Phoenix, AZ (US); Elise E. Switzer, Napa, CA (US)

(73) Assignee: Fluidic, Inc., Scottsdale, AZ (US)

( * ) Notice: Subject to any disclaimer, the term of this patent is extended or adjusted under 35 U.S.C. 154(b) by 0 days.

(21) Appl. No.: 14/044,813

(22) Filed: Oct. 2, 2013

(65) Prior Publication Data
US 2014/0113206 A1    Apr. 24, 2014

Related U.S. Application Data

(60) Provisional application No. 61/715,568, filed on Oct. 18, 2012.

(51) Int. Cl.
| | |
|---|---|
| *H01M 4/62* | (2006.01) |
| *H01M 12/08* | (2006.01) |
| *H01M 4/42* | (2006.01) |
| *H01M 4/46* | (2006.01) |

(52) U.S. Cl.
CPC .............. *H01M 4/628* (2013.01); *H01M 12/08* (2013.01); *H01M 4/42* (2013.01); *H01M 4/463* (2013.01)

(58) Field of Classification Search
CPC ............ H01M 4/9033; H01M 4/9066; H01M 4/8621; H01M 2004/8684; H01M 12/06; H01M 12/08; H01M 4/628; H01M 4/42; H01M 4/463

USPC .......................................... 429/405, 406, 535
See application file for complete search history.

(56) References Cited

U.S. PATENT DOCUMENTS

| | | | |
|---|---|---|---|
| 6,042,969 A | 3/2000 | Yamada et al. | |
| 6,291,100 B1 * | 9/2001 | Doddapaneni et al. | 429/218.1 |
| 6,524,750 B1 | 2/2003 | Mansuetto | |
| 6,818,347 B1 | 11/2004 | Jin et al. | |
| 6,908,711 B2 * | 6/2005 | Fauteux et al. | 429/231.95 |
| 8,206,469 B2 * | 6/2012 | Chiang et al. | 29/623.1 |
| 8,211,587 B2 * | 7/2012 | Ruka et al. | 429/486 |
| 8,309,259 B2 | 11/2012 | Friesen et al. | |

(Continued)

OTHER PUBLICATIONS

Intl. Search Report/Written Opinion dated Mar. 5, 2014 of PCT/US13/063134 filed Oct. 2, 2013 (8 pages).

(Continued)

*Primary Examiner* — Stewart Fraser
(74) *Attorney, Agent, or Firm* — Pillsbury Winthrop Shaw Pittman, LLP

(57) ABSTRACT

Embodiments of the invention relate to an electrochemical cell comprising: (i) a fuel electrode comprising a metal fuel, (ii) a positive electrode, (iii) an ionically conductive medium, and (iv) a dopant; the electrodes being operable in a discharge mode wherein the metal fuel is oxidized at the fuel electrode and the dopant increases the conductivity of the metal fuel oxidation product. In an embodiment, the oxidation product comprises an oxide of the metal fuel which is doped degenerately. In an embodiment, the positive electrode is an air electrode that absorbs gaseous oxygen, wherein during discharge mode, oxygen is reduced at the air electrode. Embodiments of the invention also relate to methods of producing an electrode comprising a metal and a doped metal oxidation product.

27 Claims, 3 Drawing Sheets

(56) References Cited

U.S. PATENT DOCUMENTS

| | | |
|---|---|---|
| 8,481,207 B2 | 7/2013 | Friesen et al. |
| 8,491,763 B2 | 7/2013 | Friesen et al. |
| 8,492,052 B2 | 7/2013 | Friesen et al. |
| 2004/0005265 A1* | 1/2004 | Chiang et al. ............ 423/306 |
| 2010/0285375 A1 | 11/2010 | Friesen et al. |
| 2011/0039181 A1 | 2/2011 | Friesen et al. |
| 2011/0070506 A1 | 3/2011 | Friesen et al. |
| 2011/0189551 A1 | 8/2011 | Friesen et al. |
| 2011/0200893 A1 | 8/2011 | Friesen et al. |
| 2011/0281184 A1 | 11/2011 | Friesen et al. |
| 2011/0305959 A1 | 12/2011 | Friesen et al. |
| 2011/0318657 A1 | 12/2011 | Ein-Eli et al. |
| 2012/0068667 A1 | 3/2012 | Friesen et al. |
| 2012/0214071 A1* | 8/2012 | Chiang et al. ............ 429/231.95 |
| 2012/0321970 A1 | 12/2012 | Friesen et al. |

OTHER PUBLICATIONS

Qu, X., et al., "Thermoelectric properties and electronic structure of Al-doped ZnO", Solid State Communications, vol. 151, pp. 332-336 (2011).

Liu, X, et al., "Study on the Energy Band Structure of La Doped ZnO", Advanced Materials Research vols. 233-235, pp. 2119-2124 (2011).

Yang, H., et al., "Effect of La Addition on the Electrochemical Properties of Secondary Zinc Electrodes", Journal of the Electrochemical Society, vol. 151, No. 3, pp. A389-A393 (2004).

\* cited by examiner

DEGENERATE DOPING OF METALLIC ANODES

CROSS-REFERENCE TO RELATED APPLICATION

This application claims benefit to U.S. Provisional Application Ser. No. 61/715,568 filed Oct. 18, 2012, the contents of which is incorporated herein in its entirety.

STATEMENT OF GOVERNMENT INVOLVEMENT

All publications, patents, and patent applications cited in this Specification are hereby incorporated by reference in their entirety. This invention was made with U.S. government support under Contract No. DE-AR-00000038 awarded by the Department of Energy. The government has certain rights in the invention.

FIELD OF THE INVENTION

Embodiments of the invention relate to degenerately doped oxidation products of metallic anodes in electrochemical power sources. Embodiments also relate to methods of incorporating dopants into electrochemical anodes.

BACKGROUND OF THE INVENTION

In a discharging battery, the conversion of chemical potential energy into useful electrical energy occurs by electron flow from the negative electrode, or fuel electrode acting as the anode, through an external circuit to the positive electrode, acting as the cathode. Simultaneously, ions flow through the ionically conductive medium. In a rechargeable battery, which is also known as a secondary battery, the chemical reactions can be reversed by connecting the cell to an external power supply with electron flow from the cathode to the anode. To a large degree, both the amount of energy contained in a secondary battery and the number of times it can be recharged determine its economic value.

Metal fuel negative electrodes may be paired with any number of positive electrodes, one example being an air electrode. Metal-air cells are well-known, and comprise a metal fuel electrode and an air electrode. During discharge, the metal fuel is oxidized at the metal fuel electrode and oxygen is reduced at the air electrode. In metal-air cells of the rechargeable or secondary type, the metal fuel may be reduced on the fuel electrode, and oxygen may be evolved by oxidation at the air electrode or a separate charging electrode. Metal-air electrochemical cells are able to combine the ultra-high anode capacity of batteries with the air-breathing cathode of fuel cells in order to achieve substantial energy densities that are relevant to modern energy demands.

The passivation layer can act as a protective film to minimize unfavorable corrosion during idle battery states, but by the same token, it can act as a barrier to desired corrosion (i.e. during the discharge of the battery). During discharge, the metal fuel may be oxidized to form a passivating film, the composition of which is dependent on battery chemistry. For example, zinc oxide is formed in zinc-air batteries. In a battery, this layer can passivate the metal of the fuel electrode which impedes the essential electrochemical reactions occurring at this electrode. If a constant anodic current is applied to the fuel electrode, the overpotential needed to maintain the current may increase with time, thereby drawing an increasing amount of parasitic power.

Doped oxides have been used as conductive additives in electrochemical cells to increase conductivity at both negative and positive electrodes. For example, U.S. Pat. No. 6,524,750 filed Jun. 27, 2000 teaches various doped oxide additives, specifically high conductivity oxides of differing metals than the metal fuel anode. In a similar example, U.S. Pat. No. 6,818,347 filed on Mar. 22, 2001 describes incorporation of conductive n-type doped oxide additives, specifically niobia-doped $TiO_2$ as an additive for $Zn/MnO_2$ batteries wherein Zn is the metal fuel.

Suppression of dendritic growth upon by semiconductor oxide layers upon metal fuel electrodes has been observed, for example Yang et al., "Effect of La Addition to the Electrochemical Properties of Secondary Zinc Electrodes" Journal of the Electrochemical Society, 151 (2004) pp. A389-A393 describes La addition to zinc electrodes by preparation of Zn—La alloy electrodes [$Zn_{(1-x)}La_x$, x=0.2-1]. It was observed that an enriched lanthanum oxide layer [$La_2O_3$/La $(OH)_3$] formed, which prevented dissolution of the zinc electrode oxidation products and suppressed dendritic growth upon cycling. These benefits are allegedly due to La easily forming an oxide layer that cannot be reduced. The reference states that La addition has no effect on the anodic behavior of Zn electrodes: "La addition would have little influence on the discharge behavior of the zinc electrode in practical cells." The focus of the prior art teaches towards optimization of a dendrite-suppressing oxide layer irrespective of the metal fuel, or in other words, an oxide of a differing metal than that of the fuel electrode.

Other inventions have focused on increasing the conductivity of a semi-conductive or insulating "semi"-metal fuels. Doped silicon as an active material in electrochemical cells has been proposed for example in U.S. Pat. No. 6,042,969 filed on Jul. 18, 1997 and in U.S. Patent Application Publication No. US 2011/0318657 A1 filed on Feb. 11, 2010. This prior art teaches to doping of a poorly conductive metal fuel itself, that metal being silicon.

SUMMARY OF THE INVENTION

Embodiments of the invention relate to an electrochemical cell comprising: (i) a fuel electrode comprising a metal fuel, (ii) a positive electrode, (iii) an ionically conductive medium, and (iv) a dopant; the electrodes being operable in a discharge mode wherein the metal fuel is oxidized at the fuel electrode and the dopant increases the conductivity of the metal fuel oxidation product. In an embodiment, the oxidation product comprises an oxide of the metal fuel which is doped degenerately. In an embodiment, the positive electrode is an air electrode that absorbs gaseous oxygen, wherein during discharge mode, oxygen is reduced at the air electrode. Embodiments of the invention also relate to methods of producing an electrode comprising a metal and a doped metal oxidation product.

Other objects, features, and advantages of the present invention will become apparent from the following detailed description, the accompanying drawings, and the appended claims.

DETAILED DESCRIPTION OF THE INVENTION

Figure 1:
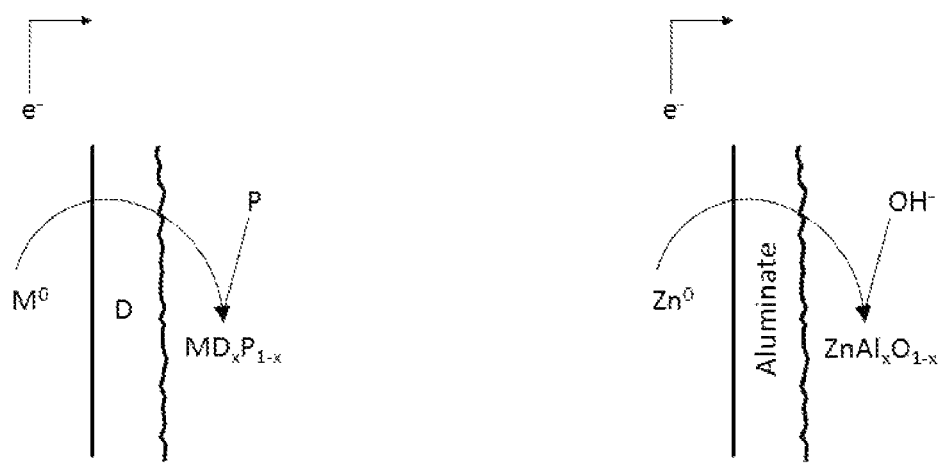
FIG. 1: Illustration of metal fuel electrode $M^0$ with surface film comprising dopant D. Upon oxidation, electrons flow from metal fuel electrode acting as anode to produced doped oxidation product $MD_xP_{1-x}$ in presence of species P, a product of cathodic reaction.

An embodiment of the invention provides for an electrochemical cell comprising: (i) a fuel electrode, (ii) a positive electrode, (iii) an ionically conductive medium and, (iv) a dopant; the electrodes being operable in a discharge mode wherein the metal fuel is oxidized at the fuel electrode and the dopant increases the conductivity of the metal oxidation product.

The electrochemical cell described herein can be any type of cell. For example, it can be a primary cell, a secondary cell, or a combination thereof. A "primary" cell can refer to a battery in which the electrochemical (redox) reaction is not reversible. On the other hand, a "secondary" cell can refer to a battery in which the electrochemical reaction is reversible. In some embodiments, the electrochemical cell can also be exposed to air, such as ambient air. The presently described cell can operate at a variety of temperatures and humidities. For example, in one embodiment, the cell is operated at room temperature (20° C.).

Electrochemical cells comprising a metal anode as the fuel electrode are common to a number of different battery architectures and chemistries. The principles and methods described herein are not limited to the foremost example of metal-air cells wherein the discharge product is an oxide of the metal fuel. In such an embodiment, the term "discharge product" may be interchangeable with "oxidation product" and the term "oxide" is an exemplary "discharge product" or "oxidation product" common to metal-air cells. Indeed, the invention may be applied to any battery chemistry comprising a metal fuel negative electrode which produces an oxidation product upon oxidation of the metal fuel.

Various types of metal-air electrochemical cells, which may comprise the doped multicomponent anode described herein, are described in U.S. Provisional Application Ser. Nos. 61/580,019 filed on Dec. 23, 2011; 61/577,490 filed on Dec. 19, 2011; 61/568,875 filed on Dec. 9, 2011; 61/383,510, filed Sep. 16, 2010; 61/355,081, filed Jun. 15, 2010; 61/334, 047, filed May 12, 2010; 61/329,278, filed Apr. 29, 2010; 61/177,072, filed May 11, 2009, and 61/267,240, filed Dec. 7, 2009, and described in U.S. patent application Ser. No. 13/526,342 filed on Jun. 18, 2012; Ser. No. 13/230,549 filed on Sep. 12, 2011; Ser. No. 13/105,794, filed on May 11, 2011; Ser. No. 13/096,851, filed Apr. 28, 2011; 13/085,714, filed Apr. 13, 2011; and Ser. No. 12/776,962, filed May 10, 2010, the disclosures of each of which are incorporated herein by reference in their entirety.

The electrochemical cell described herein can comprise an ionically conductive medium, which can be interchangeably referred to as "electrolyte" or "electrolyte solution" in some instances. The ionically conductive medium can contact at least a portion of the fuel electrode and the positive electrode such that the electrodes are in a discharge mode, whereby a metal fuel is oxidized at the fuel electrode and, for example in the case of a metal-air cell, gaseous oxygen is reduced at the air electrode. The ionically conductive medium can be in the form of a liquid, solid, gel or combination of phases. The ionically conductive medium may comprise a solid ionomer, ionic liquids, aqueous solutions, organic solvents or mixtures thereof. The medium can comprise ions, such as anions, cations, or both, that can be mobile so as to transport electrons. The ions in the medium can be supplied by a salt dissolved in the medium and any ions can be used depending on the application. Non-limiting examples are described in U.S. Provisional Application Ser. Nos. 61/580,019, 61/577,490, 61/568,875, 61/383,510, 61/355,081, 61/334,047, 61/329, 278, 61/177,072, and 61/267,240, and in U.S. patent application Ser. Nos. 13/526,342, 13/105,794, 13/096,851, 13/085,714, and 12/776,962, the disclosures of each of which are incorporated herein by reference in their entirety.

The air electrode may be made porous to provide gaseous oxygen diffusion from the air side of the electrode to reaction sites within the electrode and to provide ionic conductivity for reactants and reaction products on the electrolyte side of the electrode. The air electrode may have a level of solvophobicity with the ionically conductive medium to prevent or essentially prevent wicking (i.e., liquid permeation) of the electrolyte through the structure. A current collector may be embedded in the electrode to provide high electrical conductivity. The materials of construction may include carbon particles; PTFE, FEP, PFA, or another polymer; electrocatalysts that may be metal oxides such as manganese oxide, nickel oxide, cobalt oxide, or doped metal oxides; electrocatalysts that may be metals such as nickel, cobalt, manganese, silver, platinum, gold, palladium or another electrocatalytically active material. Further non-limiting details regarding suitable air electrodes may be found in U.S. patent application Ser. Nos. 12/385,217, 12/385,489, 12/631,484, 12/549,617, 12/776,962, 12/885,268, 12/901,410, 61/329,278, 61/243, 970, 61/414,579, 61/301,377, 61/323,384, 61/304,928, 61/334,047, 61/365,645, 61/378,026, 61/394,954, 61/358, 339, 61/383,510 and 61/355,081 the entirety of which are incorporated herein.

The fuel electrode may have any construction or configuration. For example, it is possible for the fuel electrode to be a porous structure with a three-dimensional network of pores, a mesh screen, a plurality of mesh screens isolated from one another, or any other suitable electrode. The fuel electrode can include a current collector, which may be a separate element, or the body on which the fuel is received may be electroconductive and thus also be the current collector. In one embodiment, the fuel electrode is laminated, bonded, or attached to a backing that provides the external surface of the fuel electrode. This backing may be liquid impermeable or essentially impermeable to the electrolytic medium to prevent it from permeating outwardly through the fuel electrode via its external surface. The backing can also be impermeable to air, particularly oxygen or other oxidant, to prevent any undesirable parasitic reaction, such as oxidant reduction in the presence of the fuel oxidation that occurs at the electrode during discharge.

Further details regarding metal fuels and fuel electrodes may be found in U.S. patent application Ser. Nos. 12/385,217, 12/385,489, 12/885,268, 12/901,410, 12/631,484, 12/549, 617, 13/019,923, 13/028,496, 61/193,540, 61/243,970, 61/301,377, 61/323,384, 61/329,278, 61/365,645, 61/394, 954, 61/358,339, 61/383,510, 61/568,875 and 61/577,490, the disclosures of each of which is incorporated by reference herein in their entirety.

The specific construction of the battery cell itself is not limiting, and metal-air battery constructions are known in the art.

Fuel Electrode

Depending on the particular features of the fuel electrode, its immediate environment and the applied potential, the desired corrosion or oxidation rate may be regulated. In an embodiment of the invention described herein, the impediment to current flow in batteries comprising metal fuel electrodes is mediated by doping the oxidation product of the metal fuel electrode.

In an embodiment, the fuel electrode of an electrochemical cell comprises a metal fuel and oxidation product thereof, the oxidation product comprising a dopant. The metal fuel can be any solid electro-conductor such as metals, metalloids, alloys, and heavy metal salts. The material is chemically reactive with a compatible ionically conductive medium and more electro-positive than the positive electrode (e.g. oxygen in a metal-air cell). The metal fuel may be an alkali, alkaline rare earth, transition, post-transition, metalloid or "poor" metal. In some embodiments, the metal is not a metalloid (also referred to as semi-metals). For example, the metal fuel may be selected from the group of zinc, lithium, manganese, magnesium, iron, aluminum, cadmium, lead and sodium. In preferred non-limiting embodiments, the metal fuel comprises zinc, aluminum, lithium, manganese, iron, or germanium. In an embodiment, the metal fuel may form a passive metal oxide. In an embodiment, the work function of the metal may be greater than the work function of its oxide.

Not to be bound by any theory, but the metal oxidation product may be doped to lower a potential barrier, or "Schottky" barrier, to electron flow across the metal-metal oxide interface. In accordance with terms known in the semiconductor art, "doping" is the intentional introduction of impurities, or "dopants", which results in crystal defects of a semiconductor which commonly results in modulation of its electrical properties. The term "n-type" doping, wherein "n" denotes negative, is a process wherein an "n-type dopant" donates weakly-bound outer electrons to the semiconductor. Conversely, the term "p-type" doping, wherein "p" denotes positive, is a process wherein a "p-type dopant", or acceptor material, forms "holes", or positive charges, in the semiconductor. This should not be taken as an admission that the semiconductor art is regarded as relevant or analogous. Instead, the inventors have merely used the terminology from that unrelated art to describe the same phenomena observed in the operation of their invention in the electrochemical cell art.

Again not to be bound by any particular theory, but rectifying (non-ohmic) contacts may exist at the junction of a metal and a semiconductor. A rectifying contact will have a greater barrier to electron flow in one direction. The inventors have discovered that the oxidated region of a metal fuel electrode (the passivating film) may be or behave like a semiconductor. Under some conditions, the barrier to electron flow may be larger from metal to semiconductor, i.e. oxidation/discharge. When the work function of the metal is greater than the work function of the semiconductor (e.g. ZnO ($\Phi \approx 3.2$ eV) vs Zn ($\Phi \approx 4.3$ eV) which is intrinsically n-type), electrons flow from semiconductor to metal until the Fermi levels are in equilibrium. Accordingly, the metal takes on a slight negative charge and the semiconductor takes on a slight positive charge. The result is an electrostatic potential known as the contact potential and this field is the cause of electronic band bending near the junction. In effect, this is a potential barrier to electronic flow and its degree is dependent on the work function of the metal and the semiconductor material. Under a reverse bias (i.e. oxidation/anodic), the metal becomes charged even more negatively, thus electrons in the semiconductor are repelled and the potential barrier in the semiconductor is increased. As a result, the net current flow is negligible in both directions. Alternatively, if a forward bias is applied, the potential barrier in the semiconductor is reduced so that the net electron flow is from semiconductor to metal (i.e. reduction/cathodic).

Conversely, ohmic contacts can be made at the junction of a metal and n-type doped semiconductor. For example, n-type doping introduces electronic energy levels into the semiconductor band gap wherein electrons fill these new levels close to the conduction band. In this case, as a result of n-type doping, i.e. the dopant band, the Fermi level is raised into the conduction band. At the junction of the metal and the degenerate n-type semiconductor, no barrier effectively exists for the flow of electrons in either direction thus resulting in an ohmic contact.

"Degenerately" doped semiconductors are doped to such high levels that it behaves more like a conductor than a semiconductor having conductivity levels comparable to metals. Accordingly, the dopant concentration is high enough to promote a degenerate state wherein the Fermi level is raised into the conduction band. In the case where dopant atoms are on the order of one per ten thousand atoms, the doping is referred to as heavy or high. The increase in conductivity is due to a higher concentration of charge carriers available for conduction. At room temperature, a dopant concentration greater than $10^{18}$ atoms/cm$^3$ or 0.001 at % is known as degenerate doping.

Dopants may be selected from the group of alkali metals, alkaline earth metals, transition metals, post-transition metals, lanthanoids, actinoids, or a mixture thereof. For example, the dopant is selected from the group of aluminum, lanthanum, indium, strontium, and a mixture thereof.

In an embodiment, the dopant may comprise an element which has a more negative standard redox potential in the electrochemical series (i.e. more anodic, less noble) than the metal fuel. This selection may be made to ensure the dopant does not irreversibly plate at the anode which effectively provides for battery cyclability. For example, n-type doping of zinc oxide may be achieved with aluminum, lanthanum, strontium, calcium, gallium and indium. In some embodiments, the dopant is selected to avoid the formation of a deep level trap or defect which may interfere with a more functional doped state by eliminating free electrons or electron holes. For example, copper, gold, nickel, iron or other transition metals may be avoided.

Embodiments of the invention provide for methods to incorporate dopants into the fuel electrode. Dopants can be included in the anode chemistry regardless of whether the cell is assembled in the charged (reduced) or discharged (oxidized) state. The dopant may be incorporated over the course of cell cycling i.e. "in-situ". In other embodiments, the doped oxidation layer may be formed "ex-situ", or before any cycling of an electrochemical cell.

In one embodiment, the dopant is introduced to the fuel electrode as a thin film comprising the dopant and its incorporation with the oxidation product occurs during the cycling of the electrochemical cell. An illustration of a metal fuel electrode $M^0$ with surface film comprising dopant D is shown in FIG. 1. Upon electrochemical oxidation, electrons flow out of the metal fuel electrode, acting as anode, to produce a doped oxidation product $MD_xP_{1-x}$ in presence of species P in the ionically conductive medium. For example, species P may be a product of the cathodic reaction occurring at the positive electrode. In the illustrated example of an alkaline Zn-air cell, species P is the hydroxide anion (OH$^-$) and aluminum is depicted as the dopant D which is introduced to the cell as an aluminate film.

Figure 2:
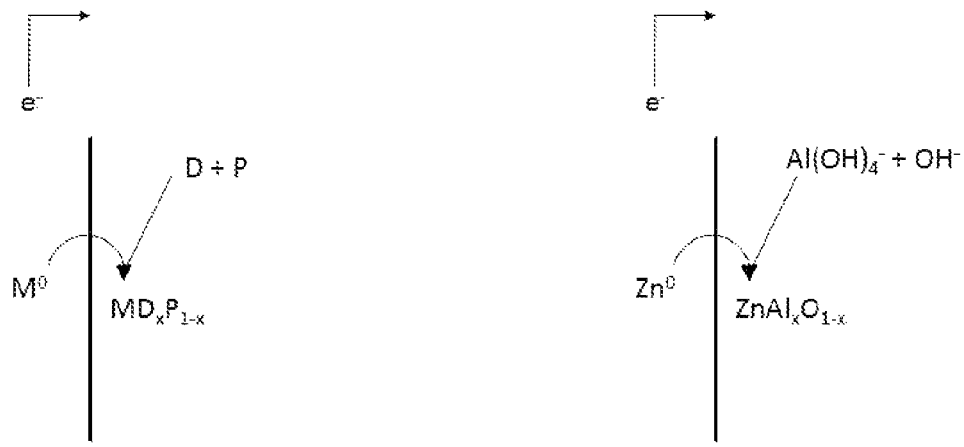
FIG. 2: Illustration of metal fuel electrode M⁰ in presence of ionically conductive medium comprising dopant D and species P, a product of cathodic reaction. Upon oxidation, electrons flow from metal fuel electrode acting as anode to produce doped oxidation product $MD_xP_{1-x}$.

In an embodiment, the dopant may be introduced as a soluble species in the ionically conductive medium as depicted in FIG. 2. The dopant may be a charged species or neutral species. As illustrated in the example, the dopant may be introduced in the form of an anion, for instance sodium aluminate dissolved in potassium hydroxide (KOH), to form aluminum-doped zinc oxide in the presence of the aluminate anion. Sodium aluminate is not very stable and may readily decompose into aluminum hydroxide and sodium hydroxide. While the addition of sodium aluminate may permit smaller particle sizes, however in other embodiments, alumina and aluminum hydroxide may be added explicitly for example. As illustrated, electrons flow from the metal fuel electrode to produce doped oxidation product $MD_xP_{1-x}$ upon oxidation. Al-doped ZnO is shown as a non-limiting example of the degenerately doped oxidation product.

Figure 3:
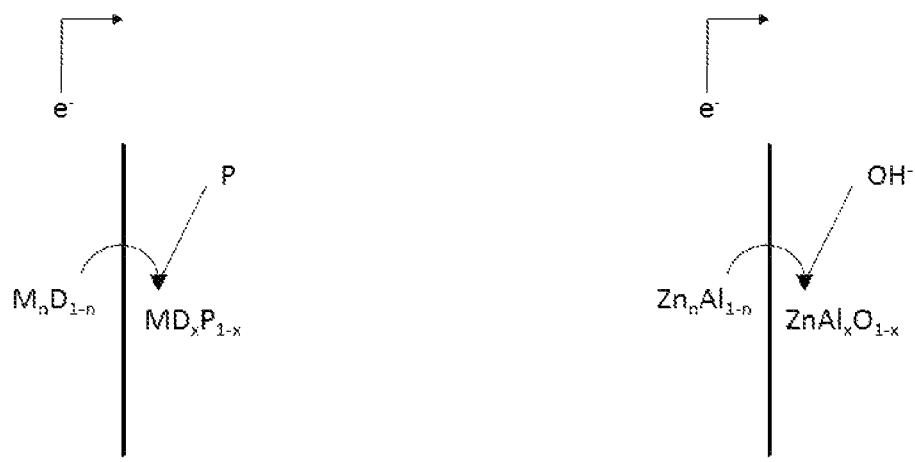
FIG. 3: Illustration of metal fuel electrode comprising alloy of metal fuel M and dopant D. Upon oxidation, electrons flow from fuel electrode acting as anode to produce doped oxidation product MDxP1-x in presence of species P, a product of cathodic reaction.

In yet another embodiment, the metal fuel may be alloyed with the doping element prior to assembly of the electrochemical cell as depicted in FIG. 3. As illustrated, the fuel electrode comprises an metallic phase alloy $M_nD_{1-n}$ of metal fuel M and dopant D. Upon oxidation, electrons flow from fuel electrode to produce doped oxidation product $MD_xP_{1-x}$ in presence of species P. Al-doped ZnO is shown as a non-limiting example of the degenerately doped oxidation product wherein species P is hydroxide ($OH^-$) in a metal-air cell.

Metal anodes are popular in a number of different battery architectures and chemistries. The principles and methods described in this patent are not limited to the primary example of zinc-air. Indeed, the object of the invention may be applied to aluminum-sulfur, zinc-nickel, iron-air, and lithium-air batteries among others. In the specific case of lithium-air, the oxidation products from the anode accumulate at the cathode, however their physical location within the cell has no bearing on the applicability of the techniques described herein.

The term "oxidation product" is used to define the substance produced by oxidation of the metal fuel. The "oxidation product" may be a discharge product due to battery cycling or a passive oxide layer. The invention described herein provides a unique oxidation product in that it is a degenerately doped form of the metal fuel oxidation product. In an embodiment, the doped oxidation product has a higher electronic conductivity than the oxidation product in absence of a dopant. In an embodiment of the invention which provides for a secondary battery, the higher conductivity may be an advantage on the charge cycle. In an embodiment, the oxidation product may be an oxide of the metal fuel. Accordingly, the term "oxide" may be used in place of "oxidation product". As such, the term "oxide" is not meant to be limiting, but is instead an example of the oxidation product.

The metal oxide layer can act as a protective film to minimize unfavorable corrosion during idle states but by the same token, it can act as a barrier to desired corrosion (i.e. during the discharge of a battery or acting as sacrificial anode). Depending on the particular features of the anode, its immediate environment and in some embodiments the applied bias, the desired oxidation rates may be regulated. The exemplary embodiments of the invention described herein relate to electrochemical cells comprising metal fuel anodes, however, the novelty may be applied to any anode comprising a metal that forms a passivation layer.

The forgoing embodiments have been of the present invention have been provided solely to illustrate the principles of the present invention and should not be regarded as limiting. To the contrary, the present invention is intended to encompass all modifications, alterations, substitutions, and equivalents within the spirit and scope of the appended claims.

What is claimed:

1. An electrochemical cell comprising:
   (i) a fuel electrode comprising a metal fuel,
   (ii) a positive electrode,
   (iii) an ionically conductive medium, and
   (iv) a dopant; the electrodes being operable in a discharge mode wherein the metal fuel is oxidized at the fuel electrode to produce a discharge oxidation product comprising the dopant, and wherein the doped discharge oxidation product has a higher conductivity than the same product in the absence of the dopant.

2. The electrochemical cell of claim 1 is a secondary battery.

3. The electrochemical cell of claim 1, wherein the ionically conductive medium is a liquid.

4. The electrochemical cell of claim 1, wherein the ionically conductive medium is a gel.

5. The electrochemical cell of claim 1, wherein the ionically conductive medium comprises a solid ionomer.

6. The electrochemical cell of claim 1, wherein the ionically conductive medium comprises an aqueous solution.

7. The electrochemical cell of claim 1, wherein the ionically conductive medium comprises a non-aqueous solvent.

8. The electrochemical cell of claim 1, wherein the ionically conductive medium comprises an ionic liquid.

9. The electrochemical cell of claim 1, wherein the metal fuel is an alkali, alkaline rare earth, transition or post-transition metal or metalloid.

10. The electrochemical cell of claim 1, wherein the metal fuel forms a passive oxide.

11. The electrochemical cell of claim 1, wherein the metal fuel is selected from the group of zinc, lithium, manganese, magnesium, iron, aluminum, cadmium, lead, sodium, germanium.

12. The electrochemical cell of claim 1, wherein the metal fuel is zinc.

13. The electrochemical cell of claim 1, wherein the metal fuel is aluminum.

14. The electrochemical cell of claim 1, wherein the discharge oxidation product comprises an oxide of the metal fuel.

15. The electrochemical cell of claim 1, wherein the discharge oxidation product is doped degenerately.

16. The electrochemical cell of claim 1, wherein the dopant is an n-type dopant.

17. The electrochemical cell of claim 1, wherein the dopant is a p-type dopant.

18. The electrochemical cell of claim 1, wherein the dopant is selected from the group of alkali metals, alkaline rare earth metals, transition metals, post-transition metals, metalloids, lanthanoids, actinoids and a mixture thereof.

19. The electrochemical cell of claim 1, wherein the dopant comprises at least one selected from the group consisting of aluminum, lanthanum, strontium, and a mixture thereof.

20. The electrochemical cell of claim 1, wherein the dopant comprises at least one element having a more negative standard redox potential in the electrochemical series than the metal fuel.

21. The electrochemical cell of claim 1, wherein the dopant is at a concentration below 10% by weight of the metal fuel.

22. The electrochemical cell of claim 1, wherein the positive electrode is an air electrode that absorbs gaseous oxygen, wherein during discharge mode, oxygen is reduced at the air electrode.

23. The electrochemical cell of claim 22, wherein the cell is exposed to ambient air.

24. The electrochemical cell of claim 22, wherein the air electrode is porous.

25. A method of producing a discharge oxidation product comprising a dopant in an electrochemical cell, the method comprising:
   (i) deposition of a film comprising the dopant on the surface of a metal fuel;
   (ii) electrochemical oxidation of the metal fuel to produce the discharge oxidation product comprising the dopant.

26. A method of producing a discharge oxidation product comprising a dopant in an electrochemical cell, the method comprising:
   (i) dissolving a salt of the dopant into a solvent forming a dopant solution and;
   (ii) electrochemical oxidation of a metal fuel in the presence of the dopant solution to produce the discharge oxidation product comprising the dopant.

27. A method of producing a discharge oxidation product comprising a dopant in an electrochemical cell, the method comprising: (i) formation of an alloy of the dopant and a metal fuel and; (ii) electrochemical oxidation of the alloy to produce the discharge oxidation product comprising the dopant.

\* \* \* \* \*